(12) United States Patent
Nakano et al.

(10) Patent No.: US 10,259,235 B2
(45) Date of Patent: Apr. 16, 2019

(54) INK JET METHOD AND INK JET APPARATUS

(71) Applicant: Seiko Epson Corporation, Tokyo (JP)

(72) Inventors: Keitaro Nakano, Matsumoto (JP); Masaaki Ando, Matsumoto (JP); Toru Saito, Yamagata (JP); Hitoshi Tsuchiya, Chino (JP); Toshiyuki Yoda, Matsumoto (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 15/891,667

(22) Filed: Feb. 8, 2018

(65) Prior Publication Data

US 2018/0257387 A1    Sep. 13, 2018

(30) Foreign Application Priority Data

Mar. 8, 2017    (JP) .................. 2017-044070

(51) Int. Cl.
| | |
|---|---|
| *B41J 2/19* | (2006.01) |
| *C09D 11/322* | (2014.01) |
| *B01D 19/00* | (2006.01) |
| *C09D 11/101* | (2014.01) |
| *B41J 2/175* | (2006.01) |
| *B41J 2/18* | (2006.01) |
| *B41J 11/00* | (2006.01) |

(52) U.S. Cl.
CPC ............ *B41J 2/19* (2013.01); *B01D 19/0063* (2013.01); *B41J 2/17596* (2013.01); *B41J 2/18* (2013.01); *C09D 11/101* (2013.01); *B41J 11/002* (2013.01); *C09D 11/322* (2013.01)

(58) Field of Classification Search
CPC ....... B41J 2/19; B41J 11/002; B01D 19/0063; C09D 11/101; C09D 11/322
See application file for complete search history.

(56) References Cited

U.S. PATENT DOCUMENTS

| | | | | |
|---|---|---|---|---|
| 6,379,796 B1 * | 4/2002 | Uenishi | .............. | B01D 19/0031 428/375 |
| 6,558,450 B2 * | 5/2003 | Sengupta | ........... | B01D 19/0031 95/46 |

(Continued)

FOREIGN PATENT DOCUMENTS

| | | |
|---|---|---|
| JP | 2013-018853 A | 1/2013 |
| JP | 2013-237276 A | 11/2013 |

*Primary Examiner* — Anh T.N. Vo
(74) *Attorney, Agent, or Firm* — Harness, Dickey & Pierce, P.L.C.

(57) ABSTRACT

An ink jet method includes a dissolved gas amount control step of controlling a dissolved gas amount of a radiation curable ink jet composition by a dissolved gas amount control unit at least a part of a flow path connecting a container receiving the ink jet composition and an outlet of an ink jet head to which the ink jet composition is supplied from the container; and an ejection step of ejecting the ink jet composition from the outlet of the ink jet head. The ink jet composition contains a polymerizable compound and a polymerization initiator, the dissolved gas amount control unit includes a member formed from an adhesive, and an absolute value ($|(\sigma1)-(\sigma2)|$) of the difference between a mass average SP value ($\sigma1$) of the polymerizable compound and a SP value ($\sigma2$) of the adhesive, each of which is calculated by Small's formula, is 1.0 or more.

8 Claims, 2 Drawing Sheets

(56) References Cited

U.S. PATENT DOCUMENTS

| | | | |
|---|---|---|---|
| 7,549,739 B2* | 6/2009 | Iwata | B01D 19/0031 347/89 |
| 9,329,524 B2* | 5/2016 | Izawa | G01N 29/024 |
| 9,393,803 B2* | 7/2016 | Ando | B41J 2/19 |
| 9,656,473 B2* | 5/2017 | Ikeda | C09D 11/101 |
| 2009/0167829 A1 | 7/2009 | Iijima | |

* cited by examiner

INK JET METHOD AND INK JET APPARATUS

BACKGROUND

1. Technical Field

The present invention relates to an ink jet method and an ink jet apparatus.

2. Related Art

Since an ink jet recording method is able to record a highly fine image by a relatively simple apparatus, techniques relating to this recording method have been rapidly developed in various fields. In particular, in order to more stably obtain a high quality recorded material, various studies have been carried out.

In order to provide a deaeration method for an ink jet ink which is excellent in productivity, storage stability, ejection property, and granularity in printing but which is a highly viscous pigment ink, for example, JP-A-2013-237276 has disclosed a deaeration method for an ink jet ink containing at least a pigment and having a viscosity of 10 to 50 mPa·sec at 25° C. In this method, the deaeration is performed using an external reflux type hollow fiber deaeration module under conditions in which the pressure loss of the hollow fiber deaeration module in deaeration is less than 0.1 MPa.

SUMMARY

However, by an ink jet method using the deaeration method as disclosed in JP-A-2013-237276, although the ejection property in printing is excellent when a highly viscous pigment ink is used, in particular, if a liquid supply temperature and/or a liquid supply pressure of the pigment ink is high, it was found that a dissolved gas amount control unit, such as a deaeration module, is degraded in some cases. When the dissolved gas amount control unit is degraded, a highly excellent ejection stability may not be obtained in some cases.

An advantage of some aspects of the invention is to provide an ink jet method which uses a dissolved gas amount control unit excellent in durability and which is able to improve the ejection stability.

Through intensive research carried out by the present inventors to overcome the above problem of the related technique, it was found that by using an ink jet method comprising a specific dissolved gas amount control step and a specific ejection step, the durability of the dissolved gas amount control unit was improved, and as a result, the invention was made.

That is, an ink jet method according to one aspect of the invention comprises: a dissolved gas amount control step of controlling a dissolved gas amount of a radiation curable ink jet composition (hereinafter, simply referred to as "composition" in some cases) by a dissolved gas amount control unit at least a part of a flow path connecting a container receiving the ink jet composition and an outlet of an ink jet head to which the ink jet composition is supplied from the container; and an ejection step of ejecting the ink jet composition from the outlet of the ink jet head. In the ink jet method described above, the ink jet composition contains a polymerizable compound and a polymerization initiator, the dissolved gas amount control unit includes a member formed from an adhesive, and an absolute value ($|(\sigma 1)-(\sigma 2)|$) of the difference between a mass average SP value ($\sigma 1$) of the polymerizable compound and an SP value ($\sigma 2$) of the adhesive is 1.0 or more.

Factors of the ink jet method as described above which overcomes the above problem of the related technique are believed as follows. However, the factors are not limited to those described below. That is, in a related ink jet method, when a dissolved gas amount control unit is provided at a flow path connecting a container receiving a composition and an ink jet head, since an adhesive is used so that members forming the dissolved gas amount control unit, such as a deaeration module, are adhered to each other and/or so that the dissolved gas amount control unit is connected to the flow path, the dissolved gas amount control unit is degraded (for example, cracks are generated in the deaeration module) by swelling of the adhesive due to the contact thereof with the composition. When the dissolved gas amount control unit is degraded, since the function of controlling a dissolved gas amount of the composition is degraded, the gas amount dissolved in the composition is out of an appropriate range, and an ejection direction and/or an ejection amount thereof is liable to be unstabilized. In addition, the composition may flow out through the cracks in some cases. On the other hand, in the ink jet method according to the aspect of the invention, since the absolute value ($|(\sigma 1)-(\sigma 2)|$) of the difference between the mass average SP value ($\sigma 1$) of the polymerizable compound mainly contained in the composition and the SP value ($\sigma 2$) of the adhesive contained in the dissolved gas amount control unit is 1.0 or more, the swelling of the adhesive mainly contained in the dissolved gas amount control unit is suppressed, and as a result, the durability thereof is improved.

In addition, in the ink jet method according to the aspect of the invention, the adhesive preferably includes an epoxy-based adhesive, the SP value ($\sigma 2$) of the adhesive is preferably 11.8 or more, and the mass average SP value ($\sigma 1$) of the polymerizable compound preferably satisfies the following formula (1).

$$|(\sigma 1)-11.8| \geq 1.0 \tag{1}$$

Furthermore, in the ink jet method according to the aspect of the invention, the mass average SP value ($\sigma 1$) of the polymerizable compound is preferably 10.0 or less, and the polymerizable compound preferably includes at least one selected from a vinyl ether group-containing (meth)acrylate represented by the following general formula (I), a monofunctional polymerizable compound having a cyclic structure, and a hydroxy group-containing monofunctional polymerizable compound.

$$CH_2=CR^1-COOR^2-O-CH=CH-R^3 \tag{I}$$

In the formula, $R^1$ represents a hydrogen atom or a methyl group, $R^2$ represents a divalent organic moiety having 2 to carbon atoms, and $R^3$ represents a hydrogen atom or a monovalent organic moiety having 1 to 11 carbon atoms.

In the ink jet method according to the aspect of the invention, the ink jet composition preferably includes a clear ink.

An ink jet apparatus according to another aspect of the invention comprises a container receiving a radiation curable ink jet composition which contains a polymerizable compound and a photopolymerization initiator; an ink jet head to which the ink jet composition is supplied from the container; a flow path connecting the container and an outlet of the ink jet head ejecting the ink jet composition; and a dissolved gas amount control unit which is disposed at at least a part of the flow path and which controls a dissolved gas amount of the ink jet composition. In this ink jet apparatus, the dissolved gas amount control unit contains an adhesive, and an absolute value (|(σ1)−(σ2)|) of the difference between a mass average SP value (σ1) of the polymerizable compound and an SP value (σ2) of the adhesive is 1.0 or more.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment (hereinafter, referred to as "this embodiment") carrying out the invention will be described in detail. The following embodiment will be described by way of example in order to depict the invention; however, the invention is not limited thereto. Within the scope of the invention, the embodiment of the invention may be appropriately modified and/or changed. In this embodiment, "(meth)acrylic acid" indicates both acrylic acid and methacrylic acid, a "(meth)acrylate" indicates both an acrylate and a methacrylate corresponding thereto, and a "(meth)acrylic" indicates both an acrylic and a methacrylic corresponding thereto.

Ink Jet Method

An ink jet method according to this embodiment (hereinafter, simply referred to as "ink jet method" in some cases) comprises a dissolved gas amount control step of controlling a dissolved gas amount of a radiation curable ink jet composition by a dissolved gas amount control unit at at least a part of a flow path connecting a container receiving the ink jet composition and an outlet of an ink jet head to which the ink jet composition is supplied from the container; and an ejection step of ejecting the ink jet composition from the outlet of the ink jet head. In addition, the ink jet composition according to this embodiment contains a polymerizable compound and a polymerization initiator, and the dissolved gas amount control unit includes a member formed from an adhesive. Furthermore, an absolute value (|(σ1)−(σ2)|) of the difference between a mass average SP value (σ1) of the polymerizable compound and an SP value (σ2) of the adhesive is 1.0 or more.

Ink Jet Composition

A radiation curable ink jet composition of this embodiment contains a polymerizable compound and a polymerization initiator and is ejected from an ink jet head which will be described later. The radiation curable ink jet composition indicates an ink jet composition to be cured by application of radiation energy, such as light irradiation. In addition, the ink jet composition is preferably a radical polymerization type in view of coated film hardness. In order to obtain a radical polymerization type ink jet composition, as the polymerizable compound which will be described later, a radical polymerizable compound may be used.

The ink jet composition may be used in various applications as a composition to be used by ejection using an ink jet method, and the applications of the composition are not limited. As the application, in particular, an ink application and a polymer formation application may be mentioned. Among those applications described above, since the advantage of the invention can be effectively and reliably obtained, the ink application is preferable. Hereinafter, although the case in which the composition of this embodiment is used as an ink jet-recording ink composition (hereinafter, simply referred to as "ink composition" or "composition" in some cases) which is one embodiment of the ink jet composition will be described in more detail, the ink jet composition of this embodiment is not limited thereto.

The factors why the ink jet method of this embodiment is superior in terms of the durability of the dissolved gas amount control unit are believed as follows. However, the factors are not limited thereto. That is, in a related ink jet method, when a dissolved gas amount control unit is provided at a flow path which connects a container receiving a composition and an ink jet head, since an adhesive is used for adhesion between members forming the dissolved gas amount control unit, such as a deaeration module, and for connection between the dissolved gas amount control unit and the flow path, the adhesive is swelled when being brought into contact with the composition, and as a result, the dissolved gas amount control unit is degraded (for example, cracks are generated in the deaeration module). When the dissolved gas amount control unit is degraded, since the function of controlling a dissolved gas amount of the composition is degraded, the gas amount dissolved in the composition is out of an appropriate range, and as a result, the ejection direction and/or the ejection amount of the composition is liable to be unstabilized in some cases. In addition, the composition may flow out through the cracks in some cases. On the other hand, according to the ink jet method of this embodiment, since the absolute value (|(σ1)−(σ2)|) of the difference between the mass average SP value (σ1) of the polymerizable compound which is mainly contained in the composition and the SP value (σ2) of the adhesive contained in the dissolved gas amount control unit is 1.0 or more, the adhesive mainly contained in the dissolved gas amount control unit is suppressed from being swelled, and as a result, the durability of the dissolved gas amount control unit is improved. In addition, according to the ink jet method of this embodiment, the dissolved gas amount of the composition can be appropriately controlled, and when the composition is a clear ink, the coloration thereof is suppressed, and the curing property of the composition is improved.

The dissolved gas amount in the composition at the flow path located at a downstream side of the dissolved gas amount control unit which will be described later is, with respect to the total mass of the composition, preferably 1.0 to 20 mass ppm, more preferably 3.0 to 20 mass ppm, and further preferably 5.0 to 20 mass ppm. Since the dissolved gas amount is 1.0 mass ppm or more, the storage stability tends to be improved, and since the dissolved gas amount is mass ppm or less, the ejection stability tends to be further improved. Based on the assumption that the composition of the dissolved gas is the same as that of dry air, the dissolved gas amount is calculated from a value obtained by a known method measuring the amount of oxygen dissolved in the composition. In particular, when the amount of oxygen dissolved in the composition is represented by A (unit: mass ppm), the amount of the dissolved gas is represented by (28.8×100/32/20.9)×A (unit: mass ppm).

As a method for adjusting the dissolved gas amount at the flow path located at a downstream side of the dissolved gas amount control unit, for example, besides a method in which adjustment is performed between the container and the ink jet head in the dissolved gas amount control step which will be described later, there may be mentioned a known method in which the dissolved gas amount in the composition received in the above container is adjusted. In order to reduce the load on the dissolved gas amount control step, this method is also preferably used together with the method described above.

In the ink jet method, the absolute value ($|(\sigma 1)-(\sigma 2)|$) of the difference between the mass average SP value ($\sigma 1$) of the polymerizable compound contained in the composition and the SP value ($\sigma 2$) of the adhesive contained in the dissolved gas amount control unit, each SP value of which is calculated by Small's formula, is 1.0 or more, preferably 1.5 or more, and more preferably 2.0 or more. Since the above absolute value is 1.0 or more, the durability of the dissolved gas amount control unit which will be described later is excellent. The above absolute value can be controlled by appropriately selecting the type and the amount of the polymerizable compound which will be described below and the type of adhesive. In addition, although the upper limit of the absolute value ($|(\sigma 1)-(\sigma 2)|$) is not particularly limited, from a design point of view of the composition to be applied to the ink jet method, for example, the upper limit may be either 9.0 or less or 7.0 or less.

In this specification, the "SP value" is the abbreviation of the solubility parameter and indicates the value calculated using Small's formula shown below.

$$\sigma = \rho \cdot (\Sigma Fi)/M$$

In the above formula, $\sigma$ represents the SP value, $\rho$ represents the density, Fi represents a molar suction force constant, and M represents the molecular weight of a repeating unit (monomer) of a polymer.

Polymerizable Compound

The polymerizable compound of this embodiment is not particularly limited as long as the absolute value ($|(\sigma 1)-(\sigma 2)|$) of the difference between the mass average SP value ($\sigma 1$) of the polymerizable compound and the SP value ($\sigma 2$) of the adhesive is set to 1.0 or more. The polymerizable compound is polymerized by the function of the polymerization initiator when radiation energy, such as light irradiation, is applied, so that the composition on a recording medium can be cured.

The mass average SP value ($\sigma 1$) of the polymerizable compound preferably satisfies the following formula (1). Since the following formula (1) is satisfied, the swelling of the adhesive tends to be more reliably suppressed.

$$|(\sigma 1)-11.8| \geq 1.0 \tag{1}$$

In the above formula, although the above "11.8" is a value obtained from experiments, this value is estimated to be close to the SP value of an epoxy resin which is a constituent component of an epoxy-based adhesive which is preferably used in this embodiment. As the SP value of the polymerizable compound becomes closer to 11.8, the polymerizable compound is more likely to be permeated into the epoxy resin-based adhesive, that is, into an epoxy resin which is a thermosetting resin, and as a result, it is estimated that the epoxy resin-based adhesive is softened and is swelled. In other words, as the $|(\sigma 1)-11.8|$ value is increased, the attack to the epoxy resin, that is, the permeation into a resin having a hydroxy group generated by an epoxy ring opening polymerization, tends to be suppressed. Hence, $|(\sigma 1)-11.8|$ is more preferably 2.0 or more and further preferably 2.3 or more.

The mass average SP value ($\sigma 1$) of the polymerizable compound is more preferably 10.5 or less, further preferably 10.0 or less, and particularly preferably 9.8 or less. Since the mass average SP value ($\sigma 1$) is 10.5 or less, the durability of the dissolved gas amount control unit tends to be further improved. The mass average SP value ($\sigma 1$) can be controlled by the type and the amount of the polymerizable compound. In addition, although the lower limit of the mass average SP value ($\sigma 1$) of the polymerizable compound is not particularly limited, for example, the lower limit of the mass average SP value ($\sigma 1$) may be either 5.0 or more or 6.0 or more.

As the polymerizable compound, in particular, a monofunctional monomer or oligomer or a polyfunctional monomer or oligomer having at least bifunctionality may be mentioned. The polymerizable compound may be used alone, or at least two types thereof may be used in combination.

In this specification, when one type of polymerizable compound is only contained in the composition, the "mass average SP value" represents the SP value of the polymerizable compound itself. When at least two types of polymerizable compounds are contained in the composition, the "mass average SP value" represents the mass average of the SP values of the respective polymerizable compounds.

In order to further improve the curing property of the composition and in order to obtain a higher versatility and a higher simplicity, the polymerizable compound preferably includes a radical polymerizable compound. In addition, besides the radical polymerizable compound or instead thereof, in order to improve the curing property, to further decrease the viscosity of the composition, and to increase the solubility of the polymerization initiator when the initiator is used, the polymerizable compound preferably include a polymerizable compound having a vinyl ether group and a (meth)acrylate group. As the polymerizable compound having a vinyl ether group and a (meth)acrylate group, a radical polymerizable compound having a vinyl ether group and a (meth)acrylate group is preferable. As the polymerizable compound described above, for example, a monofunctional and a polyfunctional (meth)acrylate each having a vinyl ether group may be mentioned, and from the same point as described above, those compounds are preferably used.

Since the monofunctional (meth)acrylate having a vinyl ether group can further decrease the viscosity of the compound, has a high flash point, and further improves the curing property of the composition, this monofunctional (meth)acrylate may be mentioned as the polymerizable compound.

As the (meth)acrylate having a vinyl ether group, in particular, there may be mentioned 2-(2-ethoxyethoxy)ethyl (meth)acrylate (ethylcarbitol (meth)acrylate), 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimetyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisoprppoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy) propyl (meth)acrylate, 2-(vinyloxyisopropoxyethoxy) propyl (meth)acrylate, 2-(vinyloxyisopropoxyisopropoxy)propyl (meth)acrylate, 2-(vinyloxyethoxyethoxy) isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, and 2-(vinyloxyethoxyethoxyethoxy)ethyl (meth)acrylate. Those compounds may be used alone, or at least two types thereof may be used in combination.

Among those compounds mentioned above, from the same point as described above, 2-(vinyloxyethoxy)ethyl (meth)acrylate, that is, at least one of 2-(vinyloxyethoxy)ethyl acrylate and 2-(vinyloxyethoxy)ethyl methacrylate, is preferable, and 2-(vinyloxyethoxy)ethyl acrylate is more preferable. Since 2-(vinyloxyethoxy)ethyl acrylate and 2-(vinyloxyethoxy)ethyl methacrylate each have a simple structure, and the molecular weight thereof is small, the viscosity of the composition can be remarkably decreased. As 2-(vinyloxyethoxy)ethyl methacrylate, for example, 2-(2-vinyloxyethoxy)ethyl methacrylate and 2-(1-vinyloxyethoxy)ethyl methacrylate may be mentioned, and as 2-(vinyloxyethoxy)ethyl acrylate, 2-(2-vinyloxyethoxy)ethyl acrylate and 2-(1-vinyloxyethoxy)ethyl acrylate may be mentioned. In addition, 2-(vinyloxyethoxy)ethyl acrylate is superior to 2-(vinyloxyethoxy)ethyl methacrylate in terms of the curing property.

The composition may also contain at least one of a monofunctional monomer and a polyfunctional monomer having at least bifunctionality other than those mentioned above. As the monomers mentioned above, in particular, there may be mentioned unsaturated carboxylic acids, such as (meth)acrylic acid, itaconic acid, crotonic acid, isocrotonic acid, and maleic acid; salts of the unsaturated carboxylic acids; an ester, a urethane, an amide, and an anhydride of the unsaturated carboxylic acids; acrylonitrile, styrene, various unsaturated polyesters, unsaturated polyethers, unsaturated polyamides, and unsaturated urethanes.

As the monofunctional oligomer and the polyfunctional oligomer having at least bifunctionality, in particular, an oligomer, such as a linear acrylic oligomer, formed from the above monomer, an epoxy (meth)acrylate, an oxetane (meth)acrylate, an aliphatic urethane (meth)acrylate, an aromatic urethane (meth)acrylate, and a polyester (meth)acrylate may be mentioned.

In addition, as other monofunctional monomers and polyfunctional monomers, an N-vinyl compound may also be included. As the N-vinyl compound, in particular, there may be mentioned N-vinyl formamide, N-vinyl carbazole, N-vinyl acetamide, N-vinyl pyrrolidone, N-vinyl caprolactam, acryloylmorpholine, and derivatives thereof.

The composition may also contain a monofunctional (meth)acrylate as the monofunctional monomer. In this case, the viscosity of the composition is further decreased, the solubilities of a photopolymerization initiator and other additives are excellent, and the ejection stability in ink jet recording is likely to be obtained. As the monofunctional (meth)acrylate, in particular, there may be mentioned isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethtylhexyl-diglycol (meth)acrylate, 2-hydroxybutyl (meth)acrylate, 4-hydroxybutyl (meth)acrylate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone-modified flexible (meth)acrylate, t-butylcyclohexyl (meth)acrylate, dicyclopentanyl (meth)acrylate, dicyclopentenyloxyethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinyl ether (meth)acrylate, and polypropylene glycol monovinyl ether (meth)acrylate. Among those compounds mentioned above, 4-hydroxybutyl (meth)acrylate, 2-hydroxyethyl (meth)acrylate, and phenoxyethyl (meth)acrylate are preferable.

The composition may also contain a polyfunctional (meth)acrylate as the polyfunctional monomer. Among the polyfunctional monomers, as a bifunctional (meth)acrylate, in particular, there may be mentioned triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol tricyclodecane di(meth)acrylate, bisphenol A EO (ethylene oxide) adduct di(meth)acrylate, bisphenol A PO (propylene oxide) adduct di(meth)acrylate, hydroxy pivalic acid neopentyl glycol di(meth)acrylate, polytetramethylene glycol di(meth)acrylate, diethylene glycol di(meth)acrylate, and triethylene glycol di(meth)acrylate.

In addition, as a (meth)acrylate having at least trifunctionality, in particular, there may be mentioned trimethylolpropane tri(meth)acrylate, EO modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, caprolactone-modified trimethylolpropane tri(meth)acrylate, pentaerythritol ethoxy tetra(meth)acrylate, and caprolactam-modified dipentaerythritol hexa(meth)acrylate.

Among those compounds mentioned above, dipropylene glycol di(meth)acrylate, tripropylene glycol di(meth)acrylate, diethylene glycol di(meth)acrylate, triethylene glycol di(meth)acrylate, and pentaerythritol tri(meth)acrylate are preferable, and dipropylene glycol di(meth)acrylate and pentaerythritol tri(meth)acrylate are more preferable.

In addition, in order to improve the toughens, the heat resistance, and the chemical resistance of a cured film, a monofunctional (meth)acrylate and a bifunctional (meth) acrylate are preferably used in combination.

In addition, since the viscosity of the composition can be further decreased, the flash point is high, and the curing property of the composition is further improved, as the polymerizable compound, at least one type selected from a vinyl ether group-containing (meth)acrylate represented by the following general formula (I), a monofunctional polymerizable compound having a cyclic structure, and a hydroxy group-containing monofunctional polymerizable compound is more preferably contained. In addition, when the composition containing the polymerizable compound as described above is a clear ink, it is preferable in view of the coloring property.

$$CH_2=CR^1-COOR^2-O-CH=CH-R^3 \qquad (I)$$

In the above formula, $R^1$ represents a hydrogen atom or a methyl group, $R^2$ represents a divalent organic moiety having 2 to 20 carbon atoms, and $R^3$ represents a hydrogen atom or a monovalent organic moiety having 1 to 11 carbon atoms.

As the monofunctional monomer, a monofunctional polymerizable compound having a cyclic structure may be mentioned. In addition, as the monofunctional polymerizable compound having a cyclic structure, for example, a monofunctional polymerizable compound having an aliphatic cyclic structure and a monofunctional polymerizable compound having a heterocyclic structure may be mentioned. In particular, cyclic trimethylolpropane formal acrylate may be mentioned.

As the hydroxy group-containing monofunctional polymerizable compound, for example, among the above monofunctional (meth)acrylates, 4-hydroxybutyl (meth)acrylate, 2-hydroxyethyl (meth)acrylate, 2-hydroxypropyl (meth) acrylate, 2-hydroxy-3-phenoxypropyl (meth)acrylate, and 2-hydroxyethyl (meth)acrylate may be mentioned. Since the composition contains a hydroxy group-containing monofunctional polymerizable compound, the curing property tends to be improved. In addition, accordingly, a preferable curing property can be obtained by a relatively small amount of the initiator, and for example, in order to suppress the coloration derived from the initiator, as the polymerizable compound, a hydroxy group-containing monofunctional polymerizable compound may be preferably used in some cases. On the other hand, since the composition contains a hydroxy group-containing monofunctional polymerizable compound, in a related ink jet method, the durability of the dissolved gas amount control unit is degraded in some cases; however, in the ink jet method of this embodiment, the durability of the dissolved gas amount control unit is excellent. In this embodiment, in the "hydroxy group-containing monofunctional polymerizable compound", the above monofunctional polymerizable compound having a cyclic structure is not included.

The content of the polymerizable compound is, with respect to the total mass (100 percent by mass) of the composition, preferably 35 to 95 percent by mass, more preferably 45 to 95 percent by mass, further preferably 55 to 90 percent by mass, and particularly preferably 75 to 90 percent by mass. Since the content of the polymerizable compound is in the range described above, the viscosity and the odor can be further decreased, and in addition, the solubility and the reactivity of a photopolymerization initiator and the surface gloss of a printed material can be further improved.

Polymerization Initiator

Although the polymerization initiator of this embodiment is not particularly limited as long as the initiator generates active species, such as radicals, cations, and anions, by radiation energy, such as ultraviolet rays and electron beams, and starts the polymerization of the above polymerizable compound, a photopolymerization initiator is preferable, and a photo radical polymerization initiator is more preferable. As the photo radical polymerization initiator, an acylphosphine oxide-based photopolymerization initiator and a thioxanthone-based photopolymerization initiator are more preferable, and the acylphosphine oxide-based photopolymerization initiator is further preferable.

Although being liable to receive oxidation inhibition, the acylphosphine oxide-based photopolymerization initiator is preferably cured by an LED having a long wavelength. In addition, the acylphosphine oxide-based photopolymerization initiator can be more preferably dissolved in the composition since the moisture content thereof is 1.0 percent by mass or less with respect to the total mass of the composition.

As the acylphosphine oxide-based photopolymerization initiator, in particular, there may be mentioned bis(2,4,6-trimethylbenzoyl)-phenylphosphine oxide, 2,4,6-trimethylbenzoyl-diphenylphosphine oxide, and bis(2,6-dimethoxybenzoyl)-2,4,4-trimethylpentylphosphine oxide.

As a commercially available product of the acylphosphine oxide-based photopolymerization initiator, in particular, for example, there may be mentioned IRGACURE 819 (trade name, bis(2,4,6-trimethylbenzoyl)-phenylphosphine oxide, manufactured by BASF), SPEEDCURE TPO (trade name, 2,4,6-trimethylbenzoyl-diphenyl-phosphine oxide, manufactured by Lambson Ltd.), and DAROCUR TPO (trade name, 2,4,6-trimethylbenzoyl-diphenylphosphine oxide, manufactured by BASF).

The content of the acylphosphine oxide-based photopolymerization initiator is preferably 3.0 to 20 percent by mass with respect to the total mass (100 percent by mass) of the composition. Since this content is 3.0 percent by mass or more, the curing property tends to be improved. From the same point as described above, the content of the acylphosphine oxide-based photopolymerization initiator is more preferably 4.0 percent by mass or more and more preferably 7.0 percent by mass or more. In addition, since this content is 20 percent by mass or less, the solubility of the solid component and the storage stability are preferably maintained, and the reliability tends to be further improved. From the same point as described above, the content of the acylphosphine oxide-based photopolymerization initiator is more preferably 15 percent by mass or less, even more preferably 13 percent by mass or less, further preferably 7.5 percent by mass or less, and even further preferably 6.5 percent by mass or less. When the content of the acylphosphine oxide-based photopolymerization initiator is 7.5 percent by mass or less, coloration derived from the photopolymerization initiator, in particular, yellow coloration, can be suppressed, and when the content is 6.5 percent by mass or less, the effect of suppressing the coloration can be further enhanced.

Since the composition contains the thioxanthone-based photopolymerization initiator, surface tackiness can be reduced, and in particular, in the case of a thin film which is liable to receive oxygen inhibition, an ink surface is cured, and color mixing and bleeding between dots can be prevented. In addition, when the acylphosphine oxide-based photopolymerization initiator and the thioxanthone-based photopolymerization initiator are both used in combination, a curing process by a UV-LED can be more preferably performed, and the curing property and the adhesion property of the composition preferably tend to be further improved.

As the thioxanthone-based photopolymerization initiator, at least one selected from thioxanthone, diethylthioxanthone, isopropylthioxanthone, and chlorothioxanthone is preferably contained. In addition, isopropylthioxanthone as the isopropylthioxanthone, and 2-chlorothioxanthone as the chlorothioxanthone are more preferable. According to a composition containing the thioxanthone-based photopolymerization initiator as described above, the curing property, the storage stability, and the ejection stability tend to be improved. Among those mentioned above, a thioxanthone-based photopolymerization initiator containing diethylthioxanthone is more preferable. Since diethylthioxanthone is contained, active species are likely to be more efficiently obtained by conversion using UV light having a wide range.

As a commercially available product of the thioxanthone-based photopolymerization initiator, in particular, there may be mentioned Speedcure DETX (2,4-diethylthioxanthone), Speedcure ITX (2-isopropylthioxanthone), Speedcure CTX (2-cholorthioxanthone), and Speedcure CPTX (1-chloro-4-propylthioxanthone) (each of which is manufactured by Lambson Ltd.); and KAYACURE DETX (2,4-diethylthioxanthone, manufactured by Nippon Kayaku Co., Ltd.).

The content of the thioxanthone-based photopolymerization initiator is, with respect to the total mass (100 percent by mass) of the composition, preferably 0.5 to 5.0 percent by mass and more preferably 1.0 to 4.0 percent by mass. Since this content is 0.5 percent by mass or more, surface tackiness can be further reduced, and in the case of a thin film which is liable to receive oxygen inhibition, an ink surface is cured, and color mixing and bleeding between dots tend to be prevented. In addition, since this content is 5.0 percent by mass or less, ink coloration caused by the initiator itself tends to be suppressed, yellowing in hue is suppressed, and the adhesion property of a cured film tends to be improved.

The composition may further contain at least one type of photo radical polymerization initiator other than those mentioned above and photo cationic polymerization initiator. As the photo radical polymerization initiator other than those mentioned above, in particular, there may be mentioned an aromatic ketone, an aromatic onium chloride compound, an organic peroxide, a thio compound (such as a thiophenyl group-containing compound), α-aminoalkyl phenone compound, a hexaaryl biimidazole compound, a ketoxime ester compound, a borate compound, an azinium compound, a metallocene compound, an active ester compound, a compound having a carbon-halogen bond, and an alkylamine compound.

As the photo cationic polymerization initiator mentioned above, in particular, a sulfonium salt, and iodonium salt may be mentioned.

The content of the photopolymerization initiator is preferably 5.0 to 20 percent by mass with respect to the total mass (100 percent by mass) of the composition. Since this content is in the range described above, a UV ray curing rate can be sufficiently obtained, and in addition, coloration derived from the photopolymerization initiator and/or a residue thereof after dissolution tends to be prevented.

Polymerization Inhibitor

In order to further improve the storage stability and the like, the composition may contain at least one type of polymerization inhibitor. As the polymerization inhibitor, in particular, there may be mentioned a hindered amine compound, such as a compound having a 2,2,6,6-tetramethylpiperidiene-N-oxyl skeleton, a compound having a 2,2,6,6-tetramethylpiperidiene skeleton, a compound having a 2,2,6,6-tetramethylpiperidiene-N-alkyl skeleton, or a compound having a 2,2,6,6-tetramethylpiperidiene-N-acyl skeleton; p-methoxyphenol, hydroquinone monomethyl ether (MEHQ), hydroquinone, cresol, t-butylcatechol, 3,5-di-t-butyl-4-hydroxytoluene, 2,2'-methylene bis(4-methyl-6-t-butylphenol), 2,2'-methylene bis(4-ethyl-6-butylphenol), or 4,4'-thio bis(3-methyl-6-t-butylphenol). As a commercially available product, for example, LA-7RD (trade name, compound having a 2,2,6,6-tetramethylpiperidiene-N-oxyl skeleton, manufactured by ADEKA Corporation) may be mentioned.

Color Material

The composition of this embodiment may further contain a color material. As the color material, at least one of a pigment and a dye may be used.

In this embodiment, since the pigment is used as the color material, the light resistance of the composition can be improved. As the pigment, either an inorganic pigment or an organic pigment may be used.

As the inorganic pigment, for example, carbon black (C.I. Pigment Black 7), such as furnace black, lamp black, acetylene black, or channel black; iron oxide, or titanium oxide may be used.

As the organic pigment, for example, there may be mentioned an azo pigment, such as an insoluble azo pigment, a condensed azo pigment, an azo chelate, or a chelate azo pigment; a polycyclic pigment, such as a phthalocyanine pigment, a perylene and perinone pigment, an anthraquinone pigment, a quinacridone pigment, a dioxane pigment, a thioindigo pigment, an isoindolinone pigment, or a quinophthalone pigment; a dye chelate (such as a basic dye type chelate or an acidic dye type chelate), a dye lake (such as a basic dye type lake or an acidic dye type lake), a nitro pigment, a nitroso pigment, an aniline black, or a daylight fluorescent pigment.

In more particular, as the carbon black to be used for a black ink, for example, there may be mentioned No. 2300, No. 900, MCF88, No. 33, No. 40, No. 45, No. 52, MA7, MA8, MA100, No. 2200B and the like (each manufactured by Mitsubishi Chemical Corporation); Raven 5750, Raven 5250, Raven 5000, Raven 3500, Raven 1255, Raven 700 and the like (each manufactured by Columbia Carbon); Regal 400R, Regal 330R, Regal 660R, Mogul L, Monarch 700, Monarch 800, Monarch 880, Monarch 900, Monarch 1000, Monarch 1100, Monarch 1300, Monarch 1400 and the like (each manufactured by Cabot Corporation); Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, Special Black 4, and the like (manufactured by Degussa).

As the pigment to be used for a white ink, C.I. Pigment White 6, 18, and 21 may be mentioned.

As the pigment to be used for a yellow ink, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

As the pigment to be used for a magenta ink, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violet 19, 23, 32, 33, 36, 38, 43, and 50.

As the pigment to be used for a cyan ink, for example, there may be mentioned C.I. Pigment Blue 1, 2, 3, 15, 15:1, 15:2, 15:3, 15:34, 15:4, 16, 18, 22, 25, 60, 65, and 66; and C.I. Vat Blue 4, and 60.

As the pigment other than magenta, cyan, and yellow, for example, there may be mentioned C.I. Pigment Green 7 and 10; C.I. Pigment Brown 3, 5, 25, and 26; C.I. Pigment Orange 1, 2, 5, 7, 13, 14, 15, 16, 24, 34, 36, 38, 40, 43, and 63.

The pigments may be used alone, or at least two types thereof may be used in combination. The content of the pigment is, with respect to the total mass (100 percent by mass) of the composition, preferably 0.1 to 15 percent by mass, more preferably 0.5 to 10 percent by mass, and further preferably 1.0 to 5.0 percent by mass. Since the content of the pigment is 0.1 percent by mass or more, a color developing property of a recorded material tends to be further improved. In addition, since the content of the pigment is 15 percent by mass or less, the dispersibility of the pigment in the composition tends to be further improved.

Even if the composition of this embodiment is a clear ink, the coloration thereof can be suppressed. The clear ink is a composition containing substantially no color material. In the clear ink, in view of the gloss, the content of the color material is, with respect to the total mass (100 percent by mass) of the clear ink, 0.10 percent by mass or less and preferably 0.05 percent by mass or less. In addition, the lower limit of the content is not particularly limited and may be less than the detection limit.

Since the composition is a clear ink, although the durability of the dissolved gas amount control unit is degraded in a related ink jet method, in the ink jet method of this embodiment, the durability of the dissolved gas amount control unit is excellent.

As the dye, for example, an acidic dye, a direct dye, a reactive dye, or a basic dye may be mentioned. In particular, there may be mentioned C.I. Acid Yellow 17, 23, 42, 44, 79, and 142; C.I. Acid Red 52, 80, 82, 249, 254, and 289; C.I. Acid Blue 9, 45, and 249; C.I. Acid Black 1, 2, 24, and 94; C.I. Food Black 1 and 2, C.I. Direct Yellow 1, 12, 24, 33, 50, 55, 58, 86, 132, 142, 144, and 173; C.I. Direct Red 1, 4, 9, 80, 81, 225, and 227; C.I. Direct Blue 1, 2, 15, 71, 86, 87, 98, 165, 199, and 202; C.I. Direct Black 19, 38, 51, 71, 154, 168, 171, and 195; C.I. Reactive Red 14, 32, 55, 79, and 249; and C.I. Reactive Black 3, 4, and 35.

The dyes may be used alone, or at least two types thereof may be used in combination. In order to obtain excellent shielding property and color reproducibility, the content of the dye is preferably 1.0 to 20 percent by mass with respect to the total mass (100 percent by mass) of the composition.

Dispersant

When the composition contains the pigment, in order to further improve the dispersibility thereof, the composition of this embodiment may further contain a dispersant. As the dispersant, for example, a dispersant formed from a resin may be mentioned. As the resin, for example, there may be mentioned a (meth)acrylic-based resin, a urethane-based resin, a polyamine-based resin, and a polyether-based resin. In more particular, there may be mentioned a resin containing as a main component, at least one selected from a polyoxyalkylene polyalkylene polyamine, a vinyl-based polymer and its copolymer, an acrylic-based polymer and its copolymer, a polyester, a polyamide, a polyimide, a polyurethane, an amino-based polymer, a silicon-containing polymer, a sulfide-containing polymer, a fluorine-containing polymer, and an epoxy resin. As a commercially available product, for example, there may be mentioned Ajisper Series manufactured by Ajinomoto Fine-Techno Co., Inc., Solsperse Series (such as "Solsperse 36000") available from Avecia or Noveon, Disper BYK Series manufactured by BYK Chemie, and Disparlon Series manufactured by Kusumoto Chemicals Ltd.

The dispersants may be used alone, or at least two types thereof may be used in combination. The content of the dispersant is, with respect to the total mass (100 percent by mass) of the composition, preferably 0.05 to 15 percent by mass, more preferably 0.2 to 10 percent by mass, and further preferably 0.5 to 5.0 percent by mass. Since the content of the dispersant is 0.05 percent by mass or more, the dispersibility of the pigment tends to be improved. In addition, since the content of the dispersant is 15 percent by mass or less, the color developing property tends to be improved.

Other Components

Besides the components described above, the composition of this embodiment may further contain arbitrary components which can be used for a related radiation curable ink jet ink composition. As the arbitrary components as described above, in particular, for example, there may be mentioned a color material, such as a dye, a surfactant, a penetrant, a moisturizing agent, a dissolution auxiliary agent, a viscosity adjuster, a pH adjuster, an antioxidant, an antiseptic agent, a fungicide, a corrosion inhibitor, a chelating agent trapping metal ions which adversely influence the dispersibility, other additives, and solvents. Those components may be used alone, or at least two types thereof may be used in combination.

Container

The container of this embodiment receives the composition. As the mode of the container, for example, there may be mentioned an ink cartridge, a pack, a bottle, a tank, a pot, and a can. Among those mentioned above, since being commonly used and easily controlled so as to have a desired moisture permeability, an ink cartridge, a pack, a bottle, and a tank are preferable, a pack is more preferable, and a film-shaped pack is further preferable.

As a constituent material of the container, in particular, there may be mentioned polyolefins, such as a polypropylene (PP) and a polyethylene; plastics, such as a poly (ethylene terephthalate) (PET), an ethylene-vinyl acetate copolymer, an ethylene-vinyl alcohol copolymer (EVOH), and a polystyrene; and various metals (including alloys). In addition, as for the plastic, a polymer formed by blending or laminating the above polymers at an appropriate ratio may also be used. The container may be formed from a film obtained by using the above constituent materials. In addition, the container may be formed by blending the above constituent materials at an appropriate ratio or by laminating a plurality of types of the above films. In the case of a film, the film may be formed by lamination. When at least two types of films are laminated to each other, those films are not always required to be the films mentioned above, and a film formed partially from another material, such as at least one type selected from a metal and a metal compound, may also be used.

In addition, in order to increase the flexibility of the container, as the constituent material of the container, a plasticizer is preferably contained. As the plasticizer, for example, there may be mentioned a fatty acid ester, an epoxy compound, and a polyester compound. Among those compounds mentioned above, in view of the versatility as the plasticizer, a fatty acid ester is preferable, and as the fatty acid ester mentioned above, in particular, there may be mentioned an adipic acid ester, and a citric acid ester. The fatty acid ester may be used alone, or at least two types thereof may be used in combination.

The container preferably has a low gas permeability. Since the gas permeability is low, even when the composition is stored in the container for a long time, an increase in dissolved gas amount in the composition tends to be suppressed. In order to obtain a container having a low gas permeability, for example, a layer formed from at least one of a metal and a metal compound is preferably provided in view of the versatility. As the metal, for example, Al and Ti may be mentioned. As the metal compound, a metal oxide is preferable, and for example, alumina, silica, titania, and zirconia may be mentioned. Those compounds may be used alone, or at least two types thereof may be used in combination.

As the use mode of the container of this embodiment, for example, there may be at least mentioned (A) a form in which the container, such as an ink cartridge, is detachably mounted to an ink jet apparatus, and the composition is sequentially supplied from the container to an ink jet head, (B) a form in which the container, such as a bottle, is separately provided from an ink jet apparatus, and when an ink is used, the ink is only transferred from the container to the ink jet apparatus, and (C) a form in which the container, such as a tank, is provided in advance in a ink jet apparatus and receives the composition.

The above (A) and (B) each can be regarded as the container from the shipment thereof to right before the ink is supplied (transferred) to the ink jet apparatus. The above (C) can be regarded as the container from the shipment of the ink jet apparatus to right before the start of the use of the ink by the ink jet apparatus. In addition, the above (A) and (C) each can be regarded as the container which is used in such a way that while the composition is supplied from the container to the ink jet apparatus through a connection portion, such as an ink tube, printing is performed by the ink jet apparatus.

In addition, the above (B) can be regarded as the container which is used in such a way that after the composition is transferred from the container to the ink jet apparatus, printing is performed by the ink jet apparatus. In addition, as an object to which the composition is transferred in the above (B), for example, a tank provided in the ink jet apparatus may be mentioned.

Although the capacity of the composition which can be received in the container is not particularly limited, the capacity is preferably 10 to 20,000 mL, more preferably 10 to 5,000 mL, and further preferably 10 to 3,000 mL. When the capacity is in the range described above, the curing property, the storage stability, and the ejection stability each can be further improved. In addition, in this specification, the "capacity" represents the volume.

Flow Path

In the ink jet apparatus, the flow path of this embodiment indicates a flow path through which the composition is allowed to flow and which connects the container and the outlet of the ink jet head. The dissolved gas amount control step which will be described below controls the dissolved gas amount of the composition at at least a part of the flow path. In particular, as the flow path, there may be mentioned a supply path supplying the composition from the container receiving the composition to the ink jet head and a distribution path through which the ink is allowed to flow to a nozzle opening portion in the ink jet head. In addition, the flow path may also include a circulation path circulating the composition.

In addition, in particular, when the flow path of this embodiment is a flow path connecting the container and the ink jet head and not including the flow path in the ink jet head, it is preferable since the advantage of the invention can be more reliably obtained.

The flow path preferably includes a circulation path circulating the composition, and the dissolved gas amount control step more preferably controls the dissolved gas amount of the composition at at least a part of this circulation path. Accordingly, even when the composition, the dissolved gas amount of which is controlled once, again absorbs a gas with time, and the dissolved gas amount thereof is increased, the dissolved gas amount of the composition can again be controlled.

The mode of the flow path may be selected in accordance with the mode of the container described above, and for example, a tube and a pipe may be mentioned. On the flow path, devices, such as a subtank, a heater, a pressure pump, an open valve actuator, and an opening/closing valve, each of which adjusts the flow of the composition, and devices, such as an integration joint and a branch joint, each of which connects between the flow paths, may be provided.

Since the flow path itself and the above various devices are provided as described above, a desired amount of the composition can be supplied from the container to the ink jet head at a desired timing, and the storage stability of the viscosity or the like of the composition can be maintained.

As a material of the member forming the flow path, for example, there may be mentioned a plastic, an elastomer, such as a natural rubber, a glass, a silicon, and a metal may be mentioned. In view of the cost and the processability, for example, the plastic and the elastomer, such as a natural rubber, are preferable. However, when the plastic and the elastomer, such as a natural rubber, are used, the steam permeability which will be described later tends to be increased. The flow path may be formed from a film using the materials mentioned above.

The member forming the flow path preferably has a low gas permeability. Since the member having a low gas permeability is used, even when the composition is stored in the flow path for a long time, the increase in dissolved gas amount in the composition tends to be suppressed. In order to decrease the gas permeability, for example, a member forming the flow path may be appropriately selected.

Ink Jet Apparatus

The ink jet apparatus of this embodiment comprises the container, an outlet of an ink jet head to which the composition of this embodiment is supplied from the container and which ejects the composition, the flow path, and a dissolved gas amount control unit which is provided at at least a part of the flow path, which controls a dissolved gas amount of the composition, and which contains the adhesive of this embodiment. In addition, the ink jet apparatus may also comprise, besides the ink jet head, a curing unit curing the composition ejected on a recording medium by irradiation of UV rays. Furthermore, as described above, the container may be provided in advance in the ink jet apparatus, may be detachably provided therefor, and may be separately provided therefrom.

The ink jet apparatus of this embodiment preferably uses the ink jet method of this embodiment. The ink jet head of this embodiment is a head to which the composition is supplied from the container and which has the outlet ejecting the composition.

The dissolved gas amount control unit of this embodiment is disposed at at least a part of the flow path connecting the container and the outlet of the ink jet head. This dissolved gas amount control unit is preferably disposed at least a part of the circulation path described above. Since the dissolved gas amount control unit is disposed at the circulation path, even when the composition, the dissolved gas amount of which is controlled once, absorbs a gas with time, and the dissolved gas amount is increased, the dissolved gas amount can again be controlled. Alternatively, in the ink jet apparatus, besides the flow path supplying the composition to the ink jet head from the container through the dissolved gas amount control unit, a flow path (bypass flow path) supplying part of the composition to the ink jet head without passing through the dissolved gas amount control unit may also be provided. Accordingly, since a composition which is not required to control the dissolved gas amount is supplied to the ink jet head through the bypass flow path, the load of the control in the dissolved gas amount control step can be reduced. Since gases, such as nitrogen and oxygen, absorbed from the air is dissolved in the composition, and the dissolved gas amount thereof is controlled by the dissolved gas amount control unit, the ejection stability is further improved.

Hereinafter, with reference to the drawings, the dissolved gas amount control unit, the flow path, and the ink jet apparatus capable of including those components will be described in detail but are not limited to those described below.

Figure 1:
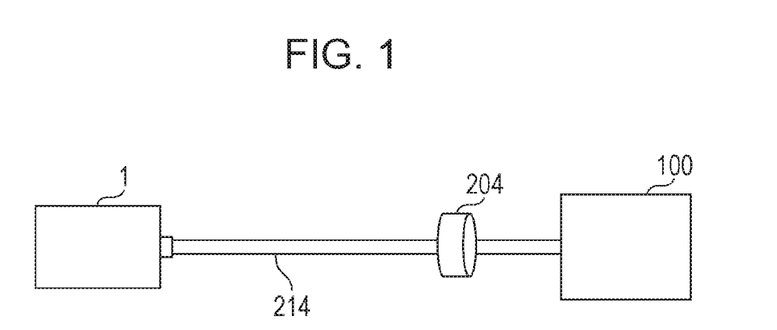
FIG. 1 is a schematic view showing one example of the arrangement of a dissolved gas amount control unit according to this embodiment.

FIG. 1 is a schematic view showing one example of the arrangement of the dissolved gas amount control unit according to this embodiment. Through a flow path 214, an ink jet head 100 receives the supply of the composition from an ink cartridge 1 and ejects the composition. The flow rate of the composition from the ink cartridge 1 is, for example, 100 mg/min. At the flow path 214 connecting the ink cartridge 1 and an outlet (not shown) of the ink jet head 100, a deaeration module 204 is provided as the dissolved gas amount control unit so as to control the dissolved gas amount of the composition flowing thereinto. As the deaeration module 204, for example, a hollow fiber deaeration module (such as trade name: "EF-g3J" manufactured by DIC Corporation) may be mentioned. Accordingly, the composition, the dissolved gas amount of which is controlled thereby, is supplied to the ink jet head 100.

Figure 2:
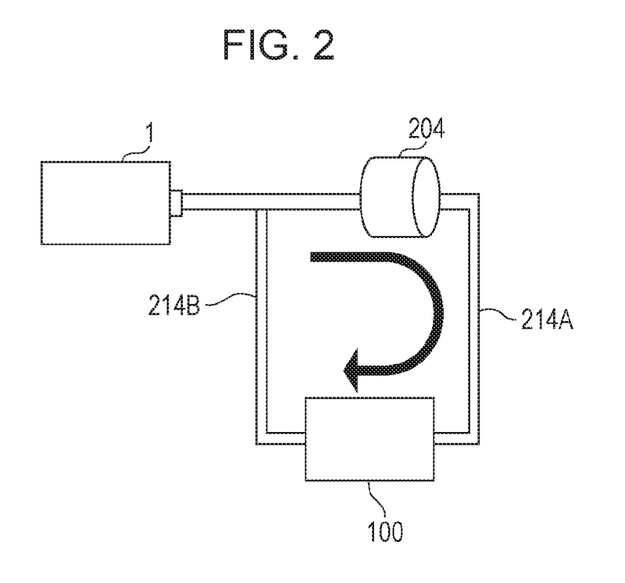
FIG. 2 is a schematic view showing another example of the arrangement of the dissolved gas amount control unit according to this embodiment.

FIG. 2 is a schematic view showing another example of the arrangement of the dissolved gas amount control unit according to this embodiment. The ink jet head 100 receives the supply of the composition from the ink cartridge 1 through an outward path 214A functioning as the flow path and ejects the composition. In this case, by the deaeration module 204 provided at the outward path 214A as the dissolved gas amount control unit, the composition, the dissolved gas amount of which is controlled, is supplied to the ink jet head 100. Subsequently, the composition which is not ejected by the ink jet head 100 is again supplied to the deaeration module 204 through a homeward path 214B. Accordingly, even when the dissolved gas amount is changed due to elapsed time, gas absorption on the flow path, and the like, the dissolved gas amount can again be controlled.

Figure 3:
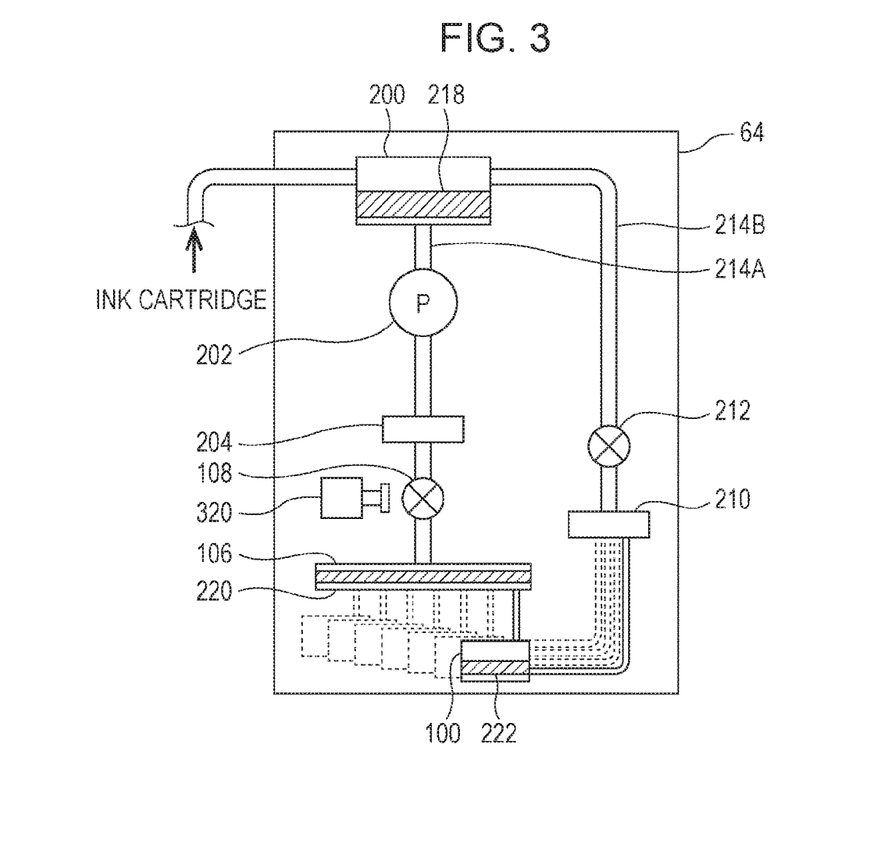
FIG. 3 is a schematic view sowing one example of an internal structure of an ink jet apparatus according to this embodiment.

FIG. 3 is a schematic view showing one example of an internal structure of the ink jet apparatus according to this embodiment. A subtank 200 receives the supply of the composition from the ink cartridge (not shown) used as the container, and the composition is supplied by a pressure pump 202 to a plurality of ink jet heads 100 through the deaeration module 204 which is one example of the dissolved gas amount control unit and a heater 220 which will be described below in detail.

The ink jet head 100 ejects the composition to a recording medium (not shown) from the outlet thereof. A pressure control valve 108 is opened by an open valve actuator 320, so that the pressure of the composition is controlled when the composition is supplied from the subtank 200 to the ink jet head 100.

The composition passing through the deaeration module 204 flows into a branch joint 106 when the pressure control valve 108 is opened. In the branch joint 106, the outward path 214A functioning as the flow path is divided into a plurality of paths, and those paths are connected to the plurality of ink jet heads 100.

The composition which is not ejected from the ink jet head 100 is circulated to the subtank 200 through an integration joint 210 and the homeward path 214B while the opening/closing valve 212 is opened. Since the composition is circulated between the subtank 200 and the ink jet head 100, even when the composition is separated and/or precipitated due to the long stay of the composition, those defects can be recovered, and the temperature of the composition thus circulated can be maintained constant. Since the composition is heated by heaters 218, 220, and 222, the viscosity of the composition is decreased so as to be appropriate for ejection from the head 100, and the head 100 ejects the composition.

Those devices are provided on a main scanning movement table 64, and while the devices are moved together therewith with respect to the recording medium, a main scanning which ejects the composition thereto from the head 100 is performed.

The deaeration module 204 includes a member formed from an adhesive. In the deaeration module 204, there may be provided a deaeration chamber (not shown) into which the composition flows and a reduced pressure chamber (not shown) in contact with the deaeration chamber with a separation membrane interposed therebetween which selectively allows a gas, such as air, to pass but disallows a liquid, such as the composition, to pass. In this case, at at least one of a member forming the deaeration chamber and the reduced pressure chamber and a connection portion between the deaeration chamber and the flow path, the adhesive is used. As the adhesive, for example, an epoxy-based adhesive may be mentioned. When the pressure in the reduced pressure chamber is reduced by a vacuum pump, air bubbles mixed in the composition in the reduced pressure chamber and gases, such as oxygen and nitrogen, dissolved in the composition are removed therefrom. Accordingly, air bubbles are suppressed from being mixed in the composition, and a composition having a lower dissolved gas amount than that of the composition supplied to the deaeration module 204 can be supplied to the ink jet head 100 and can be ejected therefrom. The deaeration module 204 of this ink jet apparatus can continuously perform deaeration of the composition while the composition is being supplied from the subtank 200 to the ink jet head 100.

As the adhesive, an epoxy-based adhesive is preferable. The epoxy-based adhesive is preferably obtained by a reaction between an epoxy resin and a curing agent. As the epoxy resin, for example, a bisphenol A-type epoxy resin, a bisphenol F-type epoxy resin, a novolac type epoxy resin, an aliphatic type epoxy resin, or a glycidylamine type epoxy resin may be used, and the bisphenol A-type epoxy resin is preferable. As the epoxy resin, in particular, jER825, jER827, jER828 (SP value: 10.6), jER828EL, jER828US, jER828XA, jER834, jER801N, jER801PN, jER802, jER811, jER813, jER816A, jER816C, jER819, jER1001 (SP value: 10.0), jER1002, and jER1003 (trade name, manufactured by Mitsubishi Chemical Corporation) may be mentioned. As the curing agent, for example, there may be used an aliphatic polyamine, a poly(amino amide), a polymer-captan, an aromatic polyamine, an acid anhydride, a phenol-novolac resin, dicyandiamide, or a diamine compound, and the diamine compound and the poly(amide amine) are preferable. As the curing agent, in particular, there may be mentioned 1,3-BAC (manufactured by Mitsubishi Chemical Corporation), MXDA (metaxylene diamine) (manufactured by Mitsubishi Chemical Corporation), triethylenetetramine, diaminodiphenylmethane, 4-methylhexahydrophthalic anhydride, a phenol-novolac resin, or a dicyandiamide. When the adhesive is obtained by a reaction between an epoxy resin and a curing agent, although the contents thereof may be appropriately adjusted, the content of the curing agent is, with respect to 100 parts by mass of the epoxy resin, preferably set to 10 to 200 parts by mass, more preferably set to 50 to 150 parts by mass, and further preferably set to 70 to 120 parts by mass.

The adhesive is applied to or filled in a portion at which adhesion is to be performed and is then cured, if needed, by heating, so that the cured product thus obtained is used. In this embodiment, the adhesive indicates a cured product of the adhesive.

The SP value of the adhesive can be appropriately adjusted by selection of the epoxy resin and the curing agent and by changing curing conditions. For example, even when the same combination of the epoxy resin and the curing agent is used, if the heating temperature is decreased, the SP value of the adhesive tends to be decreased. In addition, when the heating time is shortened, the SP value tends to be decreased. In addition, when the SP value of the epoxy resin itself is low, the SP value of the adhesive tends to be decreased. Although the measurement of the SP value of the adhesive is not particularly limited, for example, the measurement may be performed by a dissolution method in which the SP value is measured from the solubility to a solvent having a known SP value. In this embodiment, the SP value of the adhesive was measured using a dissolution method.

In this embodiment, the SP value (σ2) of the adhesive is preferably 10.5 or more, more preferably 11.0 or more, and further preferably 11.8 or more. Since the SP value (σ2) is 10.5 or more, the durability of the dissolved gas amount control unit tends to be further improved. The SP value (σ2) can be controlled by the type of adhesive. In addition, although the upper limit of the SP value (σ2) of the adhesive is not particularly limited, for example, the upper limit may be either 14.0 or less or 13.0 or less.

The deaeration module 204 may not include the separation membrane. In this case, the deaeration of the composition performed by pressure reduction in the reduced pressure chamber while the pressure control valve 108 is closed and the supply of the composition to the ink jet head 100 performed in the state in which after the deaeration is completed, the pressure of the reduced pressure chamber is returned to a normal pressure and the pressure control valve 108 is opened are intermittently repeated, so that the deaeration of the composition can be performed. The former is preferable since the composition can be continuously deaerated, and the latter is preferable since the deaeration performance is high.

In this embodiment, when the dissolved gas amount of the composition at a flow path located at a downstream side of the deaeration module 204 is 20 mass ppm or less, a composition having a more preferable ejection stability can be ejected from the ink jet head 100. In this case, when the dissolved gas amount of the composition contained in the ink cartridge is 100 mass ppm or less, even if the capacity of the dissolved gas amount control of the deaeration module 204 has a limit, the dissolved gas amount of the composition can be more easily maintained at 20 mass ppm or less, and the composition can be more easily ejected from the ink jet head 100.

Figure 4:
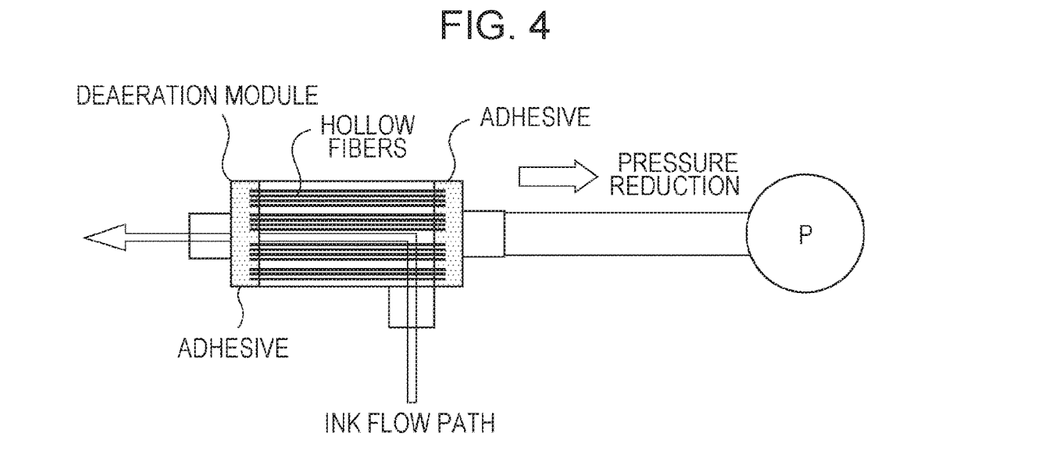
FIG. 4 is a schematic view showing one example of the dissolved gas amount control unit according to this embodiment.

FIG. 4 is a schematic view showing a deaeration module which is one example of the structure of the dissolved gas amount control unit according to this embodiment. In the deaeration module, the adhesive functions to adhere hollow fibers and the deaeration module and to seal so as not to allow the ink to flow to a vacuum pump side. Since the pressure of the inside of the hollow fibers is reduced by a vacuum pump, dissolved oxygen, nitrogen, and the like in the ink can be removed through the hollow fibers. The adhesive is used for the flow path in contact with the composition (ink composition).

By the use of the ink jet method of this embodiment, for example, since the composition is ejected to a recording medium, a recorded material is obtained. As this recording medium, for example, an absorptive recording medium or a non-absorptive recording medium may be mentioned. The ink jet method of this embodiment can be widely applied to recording media having various absorptive performances from a non-absorptive recording medium into which an aqueous ink composition is difficult to be permeated to an absorptive recording medium into which an aqueous ink composition is easily permeated. However, when the composition is applied to a non-absorptive recording medium, for example, after the composition is cured by radiation irradiation, a drying step may be required in some cases.

As the absorptive recording medium, in particular, there may be mentioned regular paper, such as electrophotographic paper, having a high ink permeability; ink jet paper (ink jet special paper including an ink absorptive layer formed from silica particles or alumina particles or an ink absorptive layer formed from a hydrophilic polymer, such as a poly(vinyl alcohol) (PVA) or a poly(vinyl pyrrolidone) (PVP)); and paper, such as art paper, coat paper, or cast paper, which has relatively low ink permeability and which is used for general offset printing.

As the non-absorptive recording medium, in particular, there may be mentioned a film and a plate formed from a plastic, such as a poly(vinyl chloride), a polyethylene, a polypropylene, or a poly(ethylene terephthalate) (PET); a plate formed from a metal, such as iron, silver, copper, or aluminum; a metal plate and a plastic-made film, each of which is manufactured by deposition of the various above metals; and a plate formed from an alloy, such as stainless steel or brass.

Dissolved Gas Amount Control Step

The ink jet method of this embodiment comprises a dissolved gas amount control step of controlling a dissolved gas amount. The dissolved gas amount control step is a step of controlling a gas amount dissolved in the composition by the above dissolved gas amount control unit.

In the dissolved gas amount control step, a liquid supply temperature is preferably 15° C. to 45° C., more preferably 17° C. to 40° C., and further preferably 30° C. to 40° C. The adjustment of the liquid supply temperature may be performed by heating using a heating mechanism provided at the flow path. A reduced pressure amount is preferably −5.0 to −90 kPa, more preferably −35 to −90 kPa, and further preferably −70 to −90 kPa. Under the conditions as described above, by the dissolved gas amount control unit, a preferable deaeration performance can be obtained, and since the adhesive contained in the composition can be suppressed from being swelled, the durability of the dissolved gas amount control unit tends to be improved. In this embodiment, the liquid supply temperature is a temperature of the composition at the dissolved gas amount control unit or at the flow path in the vicinity thereof. In addition, the "reduced pressure amount" is the amount of pressure reduced by a vacuum pump connected to the dissolved gas amount control unit (such as the deaeration module) and indicates the amount of pressure reduced from the pressure of the air (101.325 kPa). For example, when the reduced pressure amount is −80 kPa, the pressure is 21.325 kPa.

Ejection Step

The ink jet method of this embodiment comprises an ejection step. The ejection step ejects the composition from the outlet of the ink jet head. In the ejection step, a composition, the dissolved gas amount of which is controlled at least once through the dissolved gas amount control step, is ejected.

In the ejection step, the viscosity of the composition is preferably set to 25 mPa·s or less and more preferably set to 5.0 to 20 mPa·s. When the viscosity of the composition is in the range described above in the state in which the temperature of the composition is set to room temperature or the composition is not heated, the composition can be ejected when the temperature of the composition is set to room temperature or the composition is not heated. On the other hand, the composition may be ejected after the viscosity thereof is set in a preferable range by heating of the composition to a predetermined temperature. As described above, a more preferable ejection stability can be realized.

Since having a higher viscosity than that of an aqueous ink composition which is generally used as an ink jet composition, the radiation curable ink jet composition has a large variation in viscosity by the variation in temperature during the ejection. The variation in viscosity of the composition as described above has a serious influence on the change in liquid droplet size and the change in ejection rate of the liquid droplets, and as a result, the image quality may be degraded in some cases. Hence, the temperature of the composition in the ejection step is preferably maintained constant as much as possible.

Curing Step

In the ink jet method of this embodiment preferably further comprises a curing step. In the curing step, the composition ejected on a recording medium is cured by radiation irradiation. In other words, a coated film formed on the recording medium is changed into a cured film by radiation irradiation. The reason for this is that by radiation irradiation, the polymerizable compound is cured by its photopolymerization reaction. In addition, when the composition contains a polymerization initiator, since the polymerization initiator is further decomposed by radiation irradiation, initiating species, such as radicals, acids, and bases, are generated, and as a result, the polymerization reaction of the polymerizable compound is promoted by the functions of those initiating species. In this step, when a sensitizing dye is present in the composition together with the polymerization initiator, since the sensitizing dye in the system is placed in an excited state by absorption of radioactive rays and is brought into contact with the polymerization initiator, the decomposition thereof is promoted, so that a highly sensitive curing reaction can be performed.

As a radiation source, for example, a mercury lamp and a gas/solid laser are mainly used, and as a light source used for curing a radiation curable ink jet composition, a mercury lamp and a metal halide lamp have been widely known. On the other hand, nowadays, in view of environmental protection, a mercury free system has been strongly desired, and the replacement with a GaN-based semiconductor UV light-emitting device is significantly useful from industrial and environmental points of views. Furthermore, a UV light-emitting diode (UV-LED) and a UV laser diode (UV-LD) each have a compact size, a long life, a high efficiency, and a low cost and are expected as a light source for a UV curable type ink-jet ink. Among those mentioned above, a UV-LED is preferable.

In this step, a light emission peak wavelength is preferably in a range of 365 to 405 nm and more preferably in a range of 380 to 400 nm, and a composition which can be cured by irradiation of UV rays in the range as described above is preferably used. In addition, the irradiation energy is preferably 50 to 500 mJ/cm$^2$ and more preferably 100 to 400 mJ/cm$^2$.

In the case described above, because of the constituent materials of the composition described above, the curing thereof can be performed with low energy but at a high rate. The irradiation energy is calculated by multiplying an irradiation time by irradiation intensity. By the constituent materials of the composition, the irradiation time can be shortened, and in this case, a printing rate is increased. On the other hand, by the constituent materials of the composition of this embodiment, the irradiation intensity can also be decreased, and in this case, the reduction in size of the apparatus and/or the reduction in cost can be realized. In this case, for the UV irradiation, a UV-LED is preferably used. Since containing a photopolymerization initiator to be decomposed by UV irradiation in the wavelength range described above and a polymerizable compound which starts the polymerization by radiation irradiation in the wavelength described above, the composition as described above can be obtained. In addition, the number of light emission peak wavelengths may be one or at least two in the wavelength region described above. Even when a plurality of light emission peak wavelengths is present, the whole irradiation energy of UV rays having the above light emission peak wavelengths is regarded as the above irradiation energy.

The ink jet method of this embodiment may further comprise, besides the steps described above, at least one known step included in a related ink jet method.

EXAMPLES

Hereinafter, although this embodiment will be described in more detail with reference to examples and comparative examples, this embodiment is not limited thereto as long as not departing from the scope thereof.

Main structures and materials used for an ink jet apparatus, a dissolved gas amount control unit, and an ink jet composition, each of which is used in the following examples and comparative examples, are described below.

Ink Jet Apparatus

An ink jet printer PX-7500 (manufactured by Seiko Epson Corporation) modified to have the internal structure of the ink jet apparatus shown in FIG. 3 was prepared.

Dissolved Gas Amount Control Unit

A hollow fiber deaeration module (modified "EF-G3", trade name, manufactured by DIC Corporation, hereinafter, abbreviated as "deaeration module") was incorporated in a part of a flow path with joints.

Heating Device

A heating device (not shown) was incorporated in a part of the flow path with joints at an upstream side of the above dissolved gas amount control unit.

Composition

Polymerizable Compound 2-(2-vinyloxyethoxy)ethyl acrylate (manufactured by Nippon Shokubai Co., Ltd., SP value: 9.41, abbreviated as "VEEA" in the table.)

Phenoxyethyl acrylate (manufactured by Osaka Organic Chemical Industry Ltd., SP value: 9.99, abbreviated as "PEA" in the table.)

Dipropylene glycol diacrylate (manufactured by Sartomer Inc., trade name: "SR508", SP value: 9.55, abbreviated as "DPGDA" in the table.)

Tripropylene glycol diacrylate (manufactured by Shin Nakamura Chemical Co., Ltd., trade name: "APG-200", SP value: 9.49, abbreviated as "TPGDA" in the table.)

1,6-hexanediol diacrylate (manufactured by Osaka Organic Chemical Industry Ltd., trade name: "V#230", SP value: 9.31, abbreviated as "HDDA" in the table.)

Ethylcarbitol acrylate (manufactured by Osaka Organic Chemical Industry Ltd., trade name: "V#190", SP value: 9.24, abbreviated as "ECA" in the table.)

4-hydroxydibutyl acrylate (manufactured by Osaka Organic Chemical Industry Ltd., SP value: 11.31, abbreviated as "4HBA" in the table.)

Polymerization Inhibitor

Hydroquinone monomethyl ether (Tokyo Chemical Industry Co., Ltd., abbreviated as "MEHQ" in the table.)

COLOR MATERIAL

Carbon black (C.I. Pigment Black 7, manufactured by BASF.)

C.I. Pigment Blue 15: 3 (abbreviated as "PB15: 3" in the table.)

C.I. Pigment Red 122 (abbreviated as "PR122" in the table.)

C.I. Pigment Yellow 155 (abbreviated as ""PY155 in the table.)

Dispersant

Solsperse36000 (trade name, manufactured by Noveon, abbreviated as "Solsperse36000" in the table.)

Surfactant

BYK-UV 3500 (manufactured by BYK Chemie, abbreviated as "BYKUV3500" in the table.)

Preparation of Composition

Materials were mixed together to form the compositions shown in the following Table 1 and were then sufficiently stirred, so that the compositions were obtained. In addition, in the following Table 1, the numerical unit indicates percent by mass, and the total is 100.0 percent by mass. In addition, in Table 1, the mass average SP value of the polymerizable compound is the mass average calculated from the SP values of the polymerizable compounds contained in the composition and the contents thereof.

TABLE 1

| | Composition | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| VEEA | 20 | 20 | 20 | 20 | — | — | 20 | 20 | 20 | 20 | 20 | — | 20 |
| PEA | 32 | 32 | 32 | 32 | 32 | 32 | 6.0 | 6.0 | 32 | 25.7 | 25.7 | — | 38 |
| DPGDA | 24.8 | 24.8 | 22.7 | 22.7 | 22.7 | 22.7 | 25 | 21 | 27 | 4.0 | 4.0 | — | 25 |
| TPGDA | 10 | 10 | 10 | 10 | 10 | 10 | 10 | 10 | 10 | — | — | 4.7 | 10 |
| HDDA | — | — | — | — | 20 | — | — | — | — | — | — | — | — |
| ECA | — | — | — | — | — | 20 | — | — | — | — | — | — | — |
| 4HBA | — | — | — | — | — | — | 32 | 32 | — | — | — | — | — |
| N-VC | — | — | — | — | — | — | — | — | — | 20 | 20 | 15 | — |
| CTFA | — | — | — | — | — | — | — | — | — | 15 | — | 65 | — |
| IBXA | — | — | — | — | — | — | — | — | — | — | 15 | — | — |
| IRGACURE 819 | 5.0 | 5.0 | 5.0 | 5.0 | 5.0 | 5.0 | 3.0 | 5.0 | 5.0 | 5.0 | 5.0 | 5.0 | 3.0 |
| DAROCUR TPO | 5.0 | 5.0 | 5.0 | 5.0 | 5.0 | 5.0 | 3.0 | 5.0 | 5.0 | 5.0 | 5.0 | 5.0 | 3.0 |
| MEHQ | 0.5 | 0.5 | 0.5 | 0.5 | 0.5 | 0.5 | 0.5 | 0.5 | 0.5 | 0.5 | 0.5 | 0.5 | 0.5 |
| Carbon Black | 2.0 | — | — | — | — | — | — | — | — | — | — | — | — |
| PB15:3 | — | 2.0 | — | — | — | — | — | — | — | — | — | — | — |
| PR122 | — | — | 4.0 | — | — | — | — | — | — | — | — | — | — |
| PY155 | — | — | — | 4.0 | 4.0 | 4.0 | — | — | — | 4.0 | 4.0 | 4.0 | — |
| Solsperse 36000 | 0.2 | 0.2 | 0.3 | 0.3 | 0.3 | 0.3 | — | — | — | 0.3 | 0.3 | 0.3 | — |
| BYKUV3500 | 0.5 | 0.5 | 0.5 | 0.5 | 0.5 | 0.5 | 0.5 | 0.5 | 0.5 | 0.5 | 0.5 | 0.5 | 0.5 |
| Mass Average SP Value (σ1) of Polymerizable Compound | 9.6 | 9.6 | 9.6 | 9.6 | 9.6 | 9.6 | 10.1 | 10.2 | 9.6 | 9.7 | 9.5 | 9.1 | 9.7 |

N-vinylcaprolactam (manufactured by ISP (Japan) Ltd., trade name: "V-CAP", SP value: 10.65, abbreviated as "N-VC" in the table.)

Cyclic trimethylolpropane formal acrylate (manufactured by Sartomer Inc., trade name: "SR531", SP value: 8.65, abbreviated as "CTFA" in the table.)

Isobornyl acrylate (manufactured by Osaka Organic Chemical Industry Ltd., trade name: "IBXA", SP value: 7.25, abbreviated as "IBXA" in the table.)

Polymerization Initiator

IRGACURE 819 (trade name, manufactured by BASF, bis(2,4,6-trimethylbenzoyl)phenylphosphine oxide)

DAROCUR TPO (trade name, manufactured by BASF, 2,4,6-trimethylbenzoyl)-diphenyl-phosphine oxide)

Type of Adhesive

Various types of epoxy-based adhesives used here are shown in the following Table 2. The adhesive was used for adhesion between members of the deaeration module. In particular, after the adhesive was applied to portions of the members to be adhered, while the portions to be adhered were in close contact with each other, the adhesive was maintained at a predetermined temperature for a predetermined time, each of which will be described below, so that the members were adhered to each other.

TABLE 2

|  | Adhesive | | | | |
| --- | --- | --- | --- | --- | --- |
|  | No. 1 | No. 2 | No. 3 | No. 4 | No. 5 |
| SP Value (σ2) | 11.8 | 11.1 | 10.4 | 9.8 | 9.7 |
| Curing Conditions | 60° C. 15 h | 60° C. 15 h | 60° C. 15 h | 60° C. 15 h | 60° C. 15 h |

Hereinafter, the types of adhesives shown in Table 1 are shown below.

Adhesive No. 1: An epoxy resin (jER828, manufactured by Mitsubishi Chemical Corporation) and metaxylenediamine (manufactured by Mitsubishi Chemical Corporation) in equal amounts were mixed together for preparation. The curing conditions for adhesion between the members were set to 60° C. for 15 hours.

Adhesive No. 2: In Adhesive No. 1, the curing conditions for adhesion between the members were set to 50° C. for 15 hours.

Adhesive No. 3: In Adhesive No. 1, the curing conditions for adhesion between the members were set to 40° C. for 15 hours.

Adhesive No. 4: An epoxy resin (jER1001, manufactured by Mitsubishi Chemical Corporation) and metaxylenediamine (manufactured by Mitsubishi Chemical Corporation) in equal amounts were mixed together for preparation. The curing conditions for adhesion between the members were set to 60° C. for 15 hours.

Adhesive No. 5: In Adhesive No. 4, the curing conditions for adhesion between the members were set to 50° C. for 15 hours.

Swelling Property

The cured adhesives were each immersed in the composition for 1 week at 60° C. From the volumes of the adhesive before and after the immersion, the swelling rate (volume after the immersion/volume before the immersion×100%) was calculated, and the evaluation was performed in accordance with the following criteria.
Evaluation Criteria A: The swelling rate of the adhesive is less than 3%.

B: The swelling rate of the adhesive is 3% to less than 10%.

C: The swelling rate of the adhesive is 10% to less than 20%.

D: The swelling rate of the adhesive is 20% or more.

Formation of Recorded Material

An ink jet apparatus (ink jet printer PX-7500 (manufactured by Seiko Epson Corporation) modified apparatus) was prepared. This ink jet apparatus had a deaeration module containing one of the adhesives shown in the following Tables 3 and 4 and was set under one of the deaeration module flow conditions shown in the following Tables 3 and 4, and the compositions were each filled in an ink cartridge of this ink jet apparatus. The composition was ejected to 500 PET films (trade name: "PET50(K2411)PA-T1 8LKj), manufactured by Lintec Corporation) to print a solid pattern image on the PET film under conditions in which the recording resolution was 720 dpi×720 dpi and the liquid droplet weight was 7 ng. In addition, this solid pattern image was an image obtained by recording dots on all pixels each of which was the minimum recording unit region defined by the recording resolution. In addition, the "reduced pressure amount" in the table is the amount of pressure reduced by a vacuum pump connected to the deaeration module and indicates the amount of pressure reduced from the pressure of the air (101.325 kPa). That is, when the reduced pressure amount was −80 kPa, the pressure was 21.325 kPa.

While the above printing was performed, UV rays having an irradiation intensity of 400 mW/cm$^2$ and a wavelength of 395 nm were also irradiated at 600 mJ/cm$^2$ using a UV-LED provided in a UV ray irradiation device mounted at a side of a carriage, so that the solid pattern image was cured. In addition, when the tackiness of the image (surface of the coated film) was not detected by a finger touch test, the image was regarded as cured.

Curing Property

The evaluation was performed by calculating the irradiation energy of UV rays required for the curing. The irradiation energy [mJ/cm$^2$] was obtained in such a way that the irradiation intensity [mW/cm$^2$] at the surface irradiated by a light source was measured and then multiplied by the irradiation duration time [s]. The measurement of the irradiation intensity was performed using a UV ray intensity meter UM-10 and a receiving portion UM-400 (each of which was manufactured by Konica Minolta Sensing), and the evaluation was performed in accordance with the following criteria.
Evaluation Criteria A: Cured by an irradiation energy of less than 200 mJ/cm$^2$.

B: Cured by an irradiation energy of 200 mJ/cm$^2$ to less than 400 mJ/cm$^2$.

Ejection Stability

The ejection stability was evaluated in accordance with the following criteria. An ejection stability evaluated as A or B was regarded as a preferable ejection stability.
Evaluation Criteria A: The composition could be stably ejected on 500 PET films without lack of dots and curving.

B: The composition could be stably ejected on 400 PET films without lack of dots and curving.

C: The composition could not be stably ejected on 400 PET films because of lack of dots and curving.

Presence or Absence of Cracks in Deaeration Module

After the composition was ejected on 500 PET films, the presence or absence of cracks in the deaeration module was evaluated in accordance with the following criteria.
Evaluation Criteria NO: No cracks were confirmed in the deaeration module.

Yes: Cracks were confirmed in the deaeration module.

Void Property of Adhesive Layer

After the composition was ejected on 500 films, the void property of the adhesive layer was evaluated in accordance with the following criteria. When the adhesive layer was transparent, and no air bubbles were incorporated therein, the number of voids could be regarded as small (preferable void property).
Evaluation Criteria A: The adhesive layer formed by the adhesive of the deaeration module was transparent, and no air bubbles were incorporated therein.

B: The adhesive layer formed by the adhesive of the deaeration module was clouded, and air bubbles were incorporated therein.

Coloring Property

The presence or absence of coloration of a pattern image obtained by the formation of a recorded material was evaluated by visual inspection.
Evaluation Criteria A: No coloration was confirmed by visual inspection.

B: Yellow coloration was confirmed by visual inspection.

TABLE 3

| | | Example 1 | Example 2 | Example 3 | Example 4 | Comparative Example 1 | Comparative Example 2 | Comparative Example 3 | Comparative Example 4 | Comparative Example 5 | Example 5 | Example 6 |
|---|---|---|---|---|---|---|---|---|---|---|---|---|
| | Composition | 1 | 1 | 1 | 1 | 1 | 1 | 1 | 1 | 1 | 2 | 3 |
| | Adhesive | 1 | 2 | 1 | 2 | 3 | 4 | 5 | 3 | 3 | 1 | 1 |
| | \|σ1 − σ2\| | 2.2 | 1.5 | 2.2 | 1.5 | 0.8 | 0.2 | 0.1 | 0.8 | 0.8 | 2.2 | 2.2 |
| Flow Conditions of Deaeration Module | Liquid Supply Temperature [° C.] | 35 | 35 | 35 | 35 | 35 | 35 | 35 | 35 | 35 | 35 | 35 |
| | Reduced Pressure Amount [kPa] | −80 | −80 | −40 | −40 | −80 | −80 | −80 | −40 | −10 | −80 | −80 |
| | Swelling Property | A | B | A | A | B | C | D | B | A | A | A |
| | Curing Property | A | A | A | A | A | A | A | A | A | A | A |
| | Ejection Stability | A | A | B | B | C | C | C | C | C | A | A |
| | Presence or Absence of Cracks in Deaeration Module | No | No | No | No | Yes | Yes | Yes | Yes | No | No | No |
| | Void Property of Adhesive | A | A | A | A | A | A | A | A | A | A | A |
| | Coloring Property | — | — | — | — | — | — | — | — | — | — | — |

TABLE 4

| | | Example 7 | Example 8 | Example 9 | Example 10 | Example 11 | Example 12 | Example 13 | Example 14 | Example 15 | Example 16 | Comparative Example 6 |
|---|---|---|---|---|---|---|---|---|---|---|---|---|
| | Composition | 4 | 5 | 6 | 7 | 8 | 9 | 10 | 11 | 12 | 13 | 7 |
| | Adhesive | 1 | 1 | 1 | 1 | 1 | 1 | 1 | 1 | 1 | 1 | 2 |
| | \|σ1 − σ2\| | 2.2 | 2.2 | 2.2 | 1.7 | 1.6 | 2.2 | 2.1 | 2.3 | 2.7 | 2.1 | 0.8 |
| Flow Conditions of Deaeration Module | Liquid Supply Temperature [° C.] | 35 | 35 | 35 | 35 | 35 | 35 | 35 | 35 | 35 | 35 | 35 |
| | Reduced Pressure Amount [kPa] | −80 | −80 | −80 | −80 | −80 | −80 | −80 | −80 | −80 | −80 | −80 |
| | Swelling Property | A | A | A | A | A | A | A | A | A | A | C |
| | Curing Property | A | A | A | A | A | B | A | A | A | B | A |
| | Ejection Stability | A | A | A | A | A | A | A | A | A | A | C |
| | Presence or Absence of Cracks in Deaeration Module | No | No | No | No | No | No | No | No | No | No | Yes |
| | Void Property of Adhesive | A | A | A | A | A | A | A | A | A | A | A |
| | Coloring Property | — | — | — | A | B | B | — | — | — | A | A |

In those examples, when the evaluation of the swelling property is ranked as B or higher, no cracks are confirmed in the deaeration module, and the evaluation of the ejection stability is ranked as B or higher, it can be said that the advantage of the invention is obtained.

In comparison between the results of Examples 1 and and the results of Comparative Examples 1 to 4, it is found that since |(σ1)−(σ2)| is 1.0 or more, the swelling property of the adhesive can be improved.

For example, in comparison between the results of Examples 1 to 4 and the results of Comparative Examples 1, 4, and 5, it is found that when no cracks are confirmed in the deaeration module at a reduced pressure amount of −80 kPa or −40 kPa, since a preferable deaeration performance can be obtained, a preferable ejection stability can be obtained, and on the other hand, when the reduced pressure amount is −10 kPa, although the swelling property can be improved, and no cracks are not confirmed in the deaeration module, since the deaeration performance is degraded, a preferable ejection stability cannot be obtained.

From the results of Examples 5 to 16, it is found that in the various types of ink compositions, since |(σ1)−(σ2)| is 1.0 or more, the swelling property of the adhesive can be improved.

Furthermore, in comparison between the results of Examples 10, 11, 12, and 16, it is found that since the ink composition contains 4HBA, even when the amount of the initiator is relatively small, a preferable curing property can be obtained. In addition, even when 4HBA is not contained, when a predetermined amount or more of the initiator is contained, the curing property can be improved; however, in this case, it is found that coloration (yellowing) probably caused by the initiator occurs. From the results described above, in the case of a clear ink containing no color material, when the amount of the initiator is set to a predetermined value or less, and 4HBA is used, while undesirable coloration is suppressed, a preferable curing property can be obtained.

In comparison between the results of Examples 2, 10, and 11 and the result of Comparative Example 6, it is found that since the SP value of the ink composition containing 4HBA is increased and is liable to be close to the SP value of the adhesive, problems, such as swelling of the adhesive and cracks in the deaeration module, are liable to occur. Hence, in the case in which 4HBA is preferably used because of the situation as described above, it can be said that the invention is more highly useful.

The entire disclosure of Japanese Patent Application No. 2017-044070, filed Mar. 8, 2017 is expressly incorporated by reference herein.

What is claimed is:

1. An ink jet method comprising:
a dissolved gas amount control step of controlling a dissolved gas amount of a radiation curable ink jet composition by a dissolved gas amount control unit at least a part of a flow path connecting a container receiving the ink jet composition and an outlet of an ink jet head to which the ink jet composition is supplied from the container; and
an ejection step of ejecting the ink jet composition from the outlet of the ink jet head,
wherein the ink jet composition contains a polymerizable compound and a polymerization initiator,
the dissolved gas amount control unit includes a member formed from an adhesive, and
an absolute value ($|(\sigma 1)-(\sigma 2)|$) of the difference between a mass average SP value ($\sigma 1$) of the polymerizable compound and a SP value ($\sigma 2$) of the adhesive is 1.0 or more.

2. The ink jet method according to claim 1, wherein the adhesive includes an epoxy-based adhesive.

3. The ink jet method according to claim 1, wherein the SP value ($\sigma 2$) of the adhesive is 11.8 or more.

4. The ink jet method according to claim 1, wherein the mass average SP value ($\sigma 1$) of the polymerizable compound satisfies the following formula (1)

$$|(\sigma 1)-11.8| \geq 1.0 \qquad (1).$$

5. The ink jet method according to claim 1, wherein the mass average SP value ($\sigma 1$) of the polymerizable compound is 10.0 or less.

6. The ink jet method according to claim 1, wherein the polymerizable compound includes at least one selected from a vinyl ether group-containing (meth)acrylate represented by the following general formula (I), a monofunctional polymerizable compound having a cyclic structure, and a hydroxy group-containing monofunctional polymerizable compound, $$CH_2{=}CR^1{-}COOR^2{-}O{-}CH{=}CH{-}R^3 \qquad (I)$$

wherein in the formula, $R^1$ represents a hydrogen atom or a methyl group, $R^2$ represents a divalent organic moiety having 2 to 20 carbon atoms, and $R^3$ represents a hydrogen atom or a monovalent organic moiety having 1 to 11 carbon atoms.

7. The ink jet method according to claim 1, wherein the ink jet composition includes a clear ink.

8. An ink jet apparatus comprising:
a container receiving a radiation curable ink jet composition which contains a polymerizable compound and a photopolymerization initiator;
an ink jet head to which the ink jet composition is supplied from the container;
a flow path connecting the container and an outlet of the ink jet head ejecting the ink jet composition; and
a dissolved gas amount control unit which is provided at least a part of the flow path and which controls a dissolved gas amount of the ink jet composition,
wherein the dissolved gas amount control unit contains an adhesive, and
an absolute value ($|(\sigma 1)-(\sigma 2)|$) of the difference between a mass average SP value ($\sigma 1$) of the polymerizable compound and a SP value ($\sigma 2$) of the adhesive is 1.0 or more.

* * * * *